United States Patent
Harms et al.

(10) Patent No.: US 11,623,485 B1
(45) Date of Patent: Apr. 11, 2023

(54) SELF-LATCHING BALL CLAMP COUPLER

(71) Applicant: Apex Global Solutions, Inc., Sumner, TX (US)

(72) Inventors: Abraham Loewen Harms, Sumner, TX (US); Lionel Daniel Schmitt, Sumner, TX (US)

(73) Assignee: Apex Global Solutions, Inc., Sumner, TX (US)

( * ) Notice: Subject to any disclaimer, the term of this patent is extended or adjusted under 35 U.S.C. 154(b) by 0 days.

(21) Appl. No.: 17/709,121

(22) Filed: Mar. 30, 2022

(51) Int. Cl.
  *B60D 1/58* (2006.01)
  *B60D 1/06* (2006.01)

(52) U.S. Cl.
  CPC .............. *B60D 1/583* (2013.01); *B60D 1/065* (2013.01)

(58) Field of Classification Search
  CPC ........... B60D 1/583; B60D 1/065; B60D 1/06
  USPC ................. 280/507, 510, 512, 513; D12/162
  See application file for complete search history.

(56) References Cited

U.S. PATENT DOCUMENTS

| | | | | |
|---|---|---|---|---|
| 2,237,031 A * | 4/1941 | Gilmore | ................. | B60D 1/065 280/513 |
| 2,363,755 A * | 11/1944 | Smith | .................... | B60D 1/065 280/512 |
| 3,139,291 A * | 6/1964 | Geresy | .................. | B60D 1/065 70/229 |
| 3,467,409 A * | 9/1969 | Unter | ..................... | B60D 1/065 280/513 |
| 4,527,925 A * | 7/1985 | Bauer | ................. | F16C 11/0647 403/328 |
| 7,690,673 B1 * | 4/2010 | Kraai | ..................... | B60D 1/065 280/507 |
| 7,722,073 B2 * | 5/2010 | Goettker | ................ | B60D 1/065 280/513 |
| 10,654,328 B2 * | 5/2020 | Rametta | ................... | B60D 1/06 |
| 2011/0241312 A1 * | 10/2011 | Goettker | ................ | B60D 1/065 280/513 |
| 2013/0001923 A1 * | 1/2013 | MacKarvich | .......... | B60D 1/065 280/511 |
| 2014/0015226 A1 * | 1/2014 | MacKarvich | .......... | B60D 1/065 280/509 |
| 2014/0131979 A1 * | 5/2014 | MacKarvich | .......... | B60D 1/065 280/511 |

\* cited by examiner

*Primary Examiner* — Anne Marie M Boehler (57) ABSTRACT

A ball hitch coupler includes a body having a socket therein, the socket sized for receiving a ball on a ball hitch. The body includes an opening through an upper surface of the body into the socket. A latch release is pivotably mounted on the upper surface of the body, and may include a drain hole or trough forming a catch for tips of the latch release when in the open position. A latch rod extends through the opening through the upper surface of the body and connected at a first end that is external to the body to the latch release. A latch is secured to a second end of the latch rod inside the socket, the latch including a tab projecting from a rear surface of the latch and received by a slot within the body to guide movement of the latch.

13 Claims, 12 Drawing Sheets

SELF-LATCHING BALL CLAMP COUPLER

TECHNICAL FIELD

The present application relates generally to ball clamp couplers for engaging ball hitches and, more specifically, to self-latching ball clamp couplers.

BACKGROUND

Towed vehicles such as trailers typically couple to a pulling vehicle using a ball and socket type coupler. A ball hitch mounted to a frame member at the rear of the towing vehicle is received within the socket of the coupler at the front of the trailer or the like. A latching mechanism retains the ball within the socket to secure the connection while allowing the coupler to swivel about the ball. Manual latching mechanisms include a handle or similar latch control that is movable between open and closed positions, in which the ball can be inserted into or removed from the socket or in which the ball is retained within the socket, respectively. As implied, manual movement of the handle is necessary.

Self-latching couplers include a latching mechanism automatically actuated when the ball is inserted into the socket or, more commonly, the socket is lowered onto and around the ball. A manual control is normally provided for releasing the latching mechanism in order to remove the ball from the socket (e.g., by raising the coupler off the ball hitch). Existing designs for self-latching couplers have known issues with relating to weight, ease of manufacture, and potential for sticking.

SUMMARY

In one embodiment, a ball hitch coupler includes a body having a socket therein, the socket sized for receiving a ball on a ball hitch, wherein the body includes an opening through an upper surface of the body into the socket. A latch release is pivotably mounted on the upper surface of the body. A latch rod extends through the opening through the upper surface of the body and connected at a first end that is external to the body to the latch release. A latch is secured to a second end of the latch rod inside the socket, the latch including a tab projecting from a rear surface of the latch and received by a slot within the body to guide movement of the latch.

In another embodiment, a ball hitch coupler includes a body having a socket therein, the socket sized for receiving a ball on a ball hitch, wherein the body includes an opening through an upper surface of the body into the socket. A latch release is pivotably mounted on a latch mount integrally formed on the upper surface of the body, the latch mount having surfaces forming a trough forming a catch for tips of the latch release when the latch release is in an open position. A latch rod extends through the opening through the latch mount and connected at a first end that is external to the body to the latch release. A latch is secured to a second end of the latch rod inside the socket, the latch including a tab projecting from a rear surface of the latch and received by a slot within the body to guide movement of the latch.

In yet another embodiment, a ball hitch coupler includes a body having a socket therein, the socket sized for receiving a ball on a ball hitch, wherein the body includes an opening through an upper surface of the body into the socket. A latch release is pivotably mounted on a latch mount integrally formed on the upper surface of the body, the latch mount having a drain hole forming a catch for tips of the latch release when the latch release is in an open position. A latch rod extends through the opening through the latch mount and connected at a first end that is external to the body to the latch release. A latch is secured to a second end of the latch rod inside the socket, the latch including a tab projecting from a rear surface of the latch and received by a slot within the body to guide movement of the latch.

In any of the foregoing embodiments, rotation of the latch release from a closed position toward an open position retracts a portion of the latch rod through the opening through the body and moves the latch upward within the socket while the tab slides within the slot. Rotation of the latch release from the open position toward the closed position extends the portion of the latch rod through the opening through the body and moves the latch downward within the socket while the tab slides within the slot.

In any of the foregoing embodiments, a spring is positioned relative to the latch rod and the body to urge the latch toward downward movement into the socket.

In any of the foregoing embodiments, insertion of the ball into the socket pushes the latch upward against the spring until the latch is adjacent to a largest circumferential surface of a ball. Once the latch is adjacent to the largest circumferential surface of the ball, the spring automatically moves the latch downward into a position at which the latch blocks withdrawal of the ball from the socket.

In any of the foregoing embodiments, while the ball is inserted in the socket, rotation of the latch release from the closed position to the open position moves the latch to or above the position adjacent to the largest circumferential surface of the ball, allowing the ball to be withdrawn from the socket.

In any of the foregoing embodiments, the body includes a nose including the socket at a first end and spaced apart sidewalls at a second end, the spaced apart sidewalls including holes for securing the body to a tongue of a trailer to be towed.

In any of the foregoing embodiments, the body includes a latch mount integrally formed with the body, the latch mount having flanges with holes therethrough, wherein one or more holes in the latch release align with the holes through the flanges when the latch release is in a closed position, and wherein a locking pin is received by the one or more holes in the latch release and the holes through the flanges.

In some of the foregoing embodiments, the latch mount includes upper surfaces forming a trough.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 3C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged ball clamp coupler used to secure a trailer or other towed vehicle to the pulling vehicle.

Figure 1:
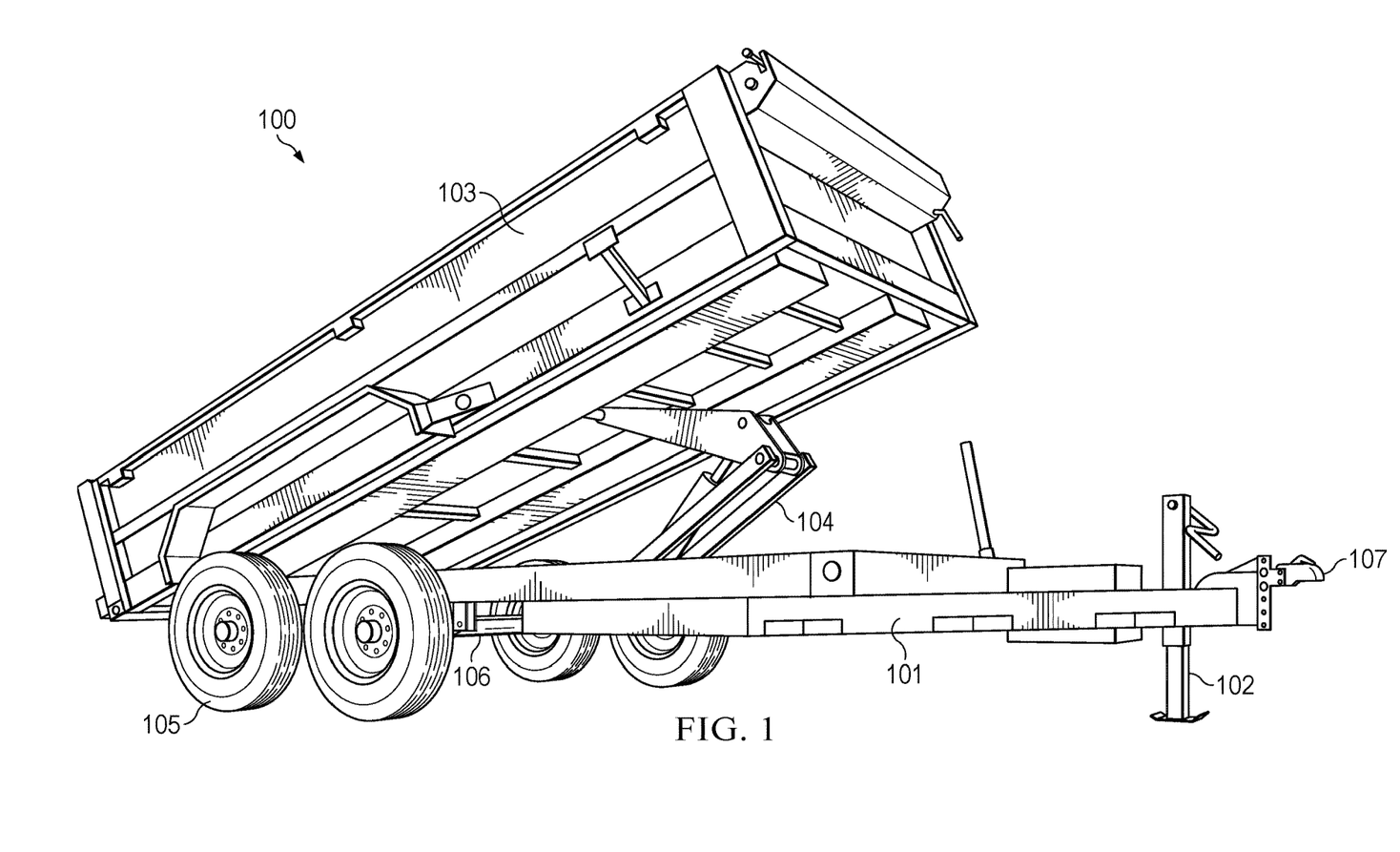
FIG. 1 illustrates a trailer including a self-latching ball clamp coupler according to embodiments of the present disclosure.

FIG. 1 illustrates a trailer including a self-latching ball clamp coupler according to embodiments of the present disclosure. The embodiment of the trailer 100 illustrated in FIG. 1 is for illustration only. FIG. 1 does not limit the scope of this disclosure to any particular implementation of a trailer.

Referring now to FIG. 1, the trailer 100 includes a frame 101 that includes a tongue at the front portion thereof, where a drop-leg 102 is mounted to the tongue and extendable to support the trailer 100 in a horizontal position when the trailer is not connected to a towing vehicle (not shown) but retractable when the trailer is so connected. A bed or platform 103 for supporting cargo is secured to the frame 101, optionally with sidewalls. In the example shown, trailer 100 is a dumping trailer with a scissor hoist 104 for raising the platform 103 in order to dump cargo. Wheels 105 are mounted to axles 106 secured to the frame 101, rolling freely so that the trailer may be towed and optionally including brakes (not shown).

Mounted to the end of the tongue for the frame 101 is a coupler 107 for receiving a ball. The coupler 107 is self-latching, and includes the structures arranged as described in further detail below.

FIGS. 2A through 2I illustrate a self-actuating ball clamp coupler in accordance with one embodiment of the present disclosure. The embodiment of the self-actuating ball clamp coupler 107a depicted in FIGS. 2A-2I is for illustration only. FIGS. 2A-2I do not limit the scope of this disclosure to any particular implementation of a self-actuating ball clamp coupler.

Figure 2A:
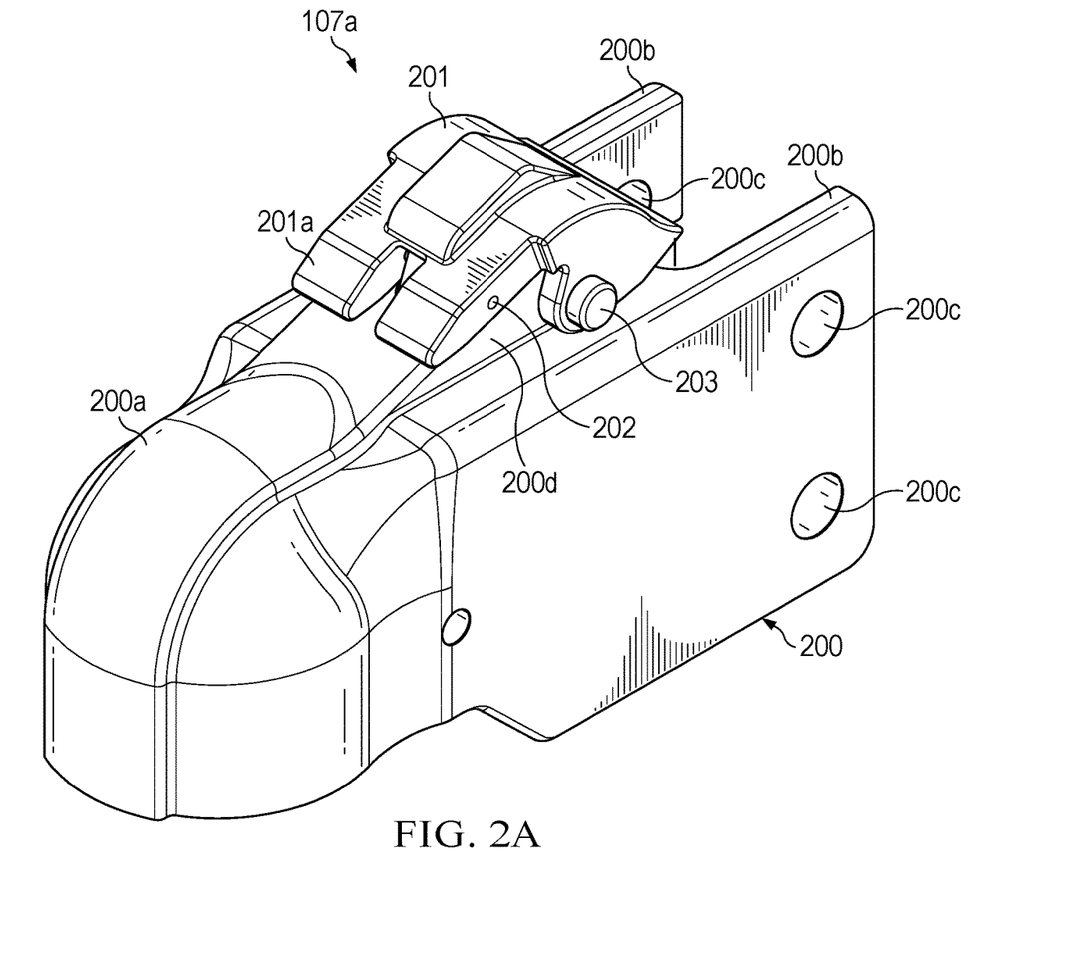
FIGS. 2A through 2I illustrate a self-actuating ball clamp coupler in accordance with one embodiment of the present disclosure.
Figure 2B:
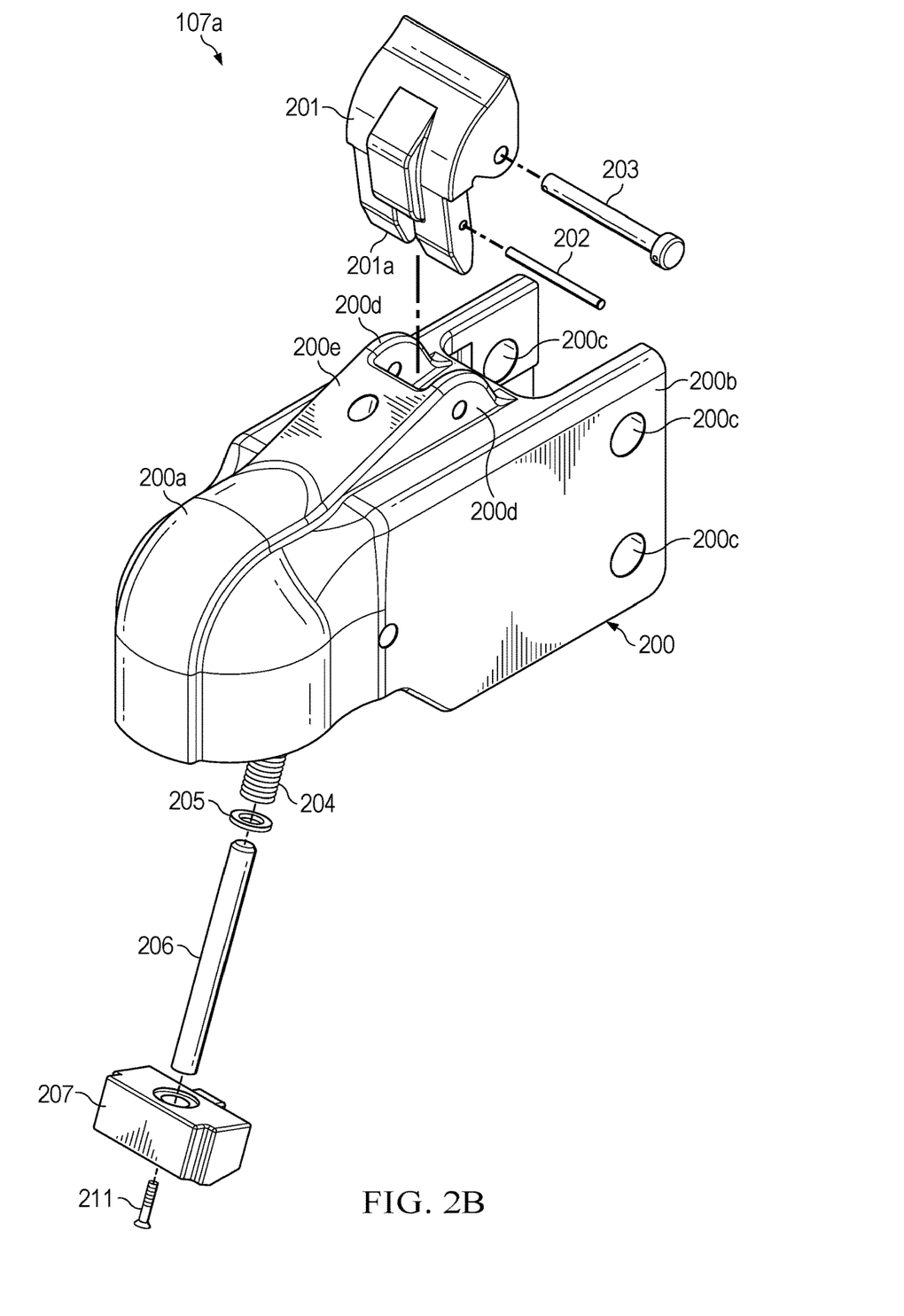
Figure 2C:
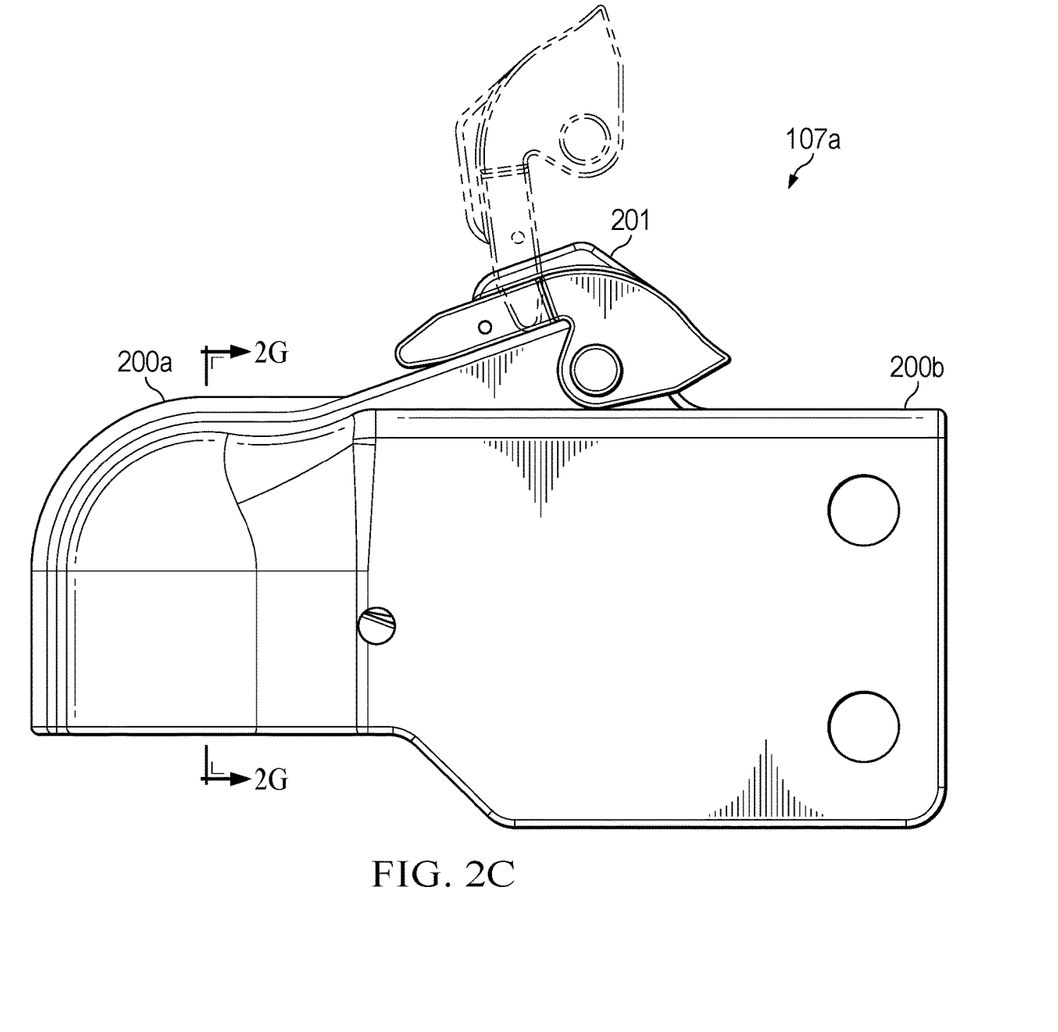
Figure 2D:
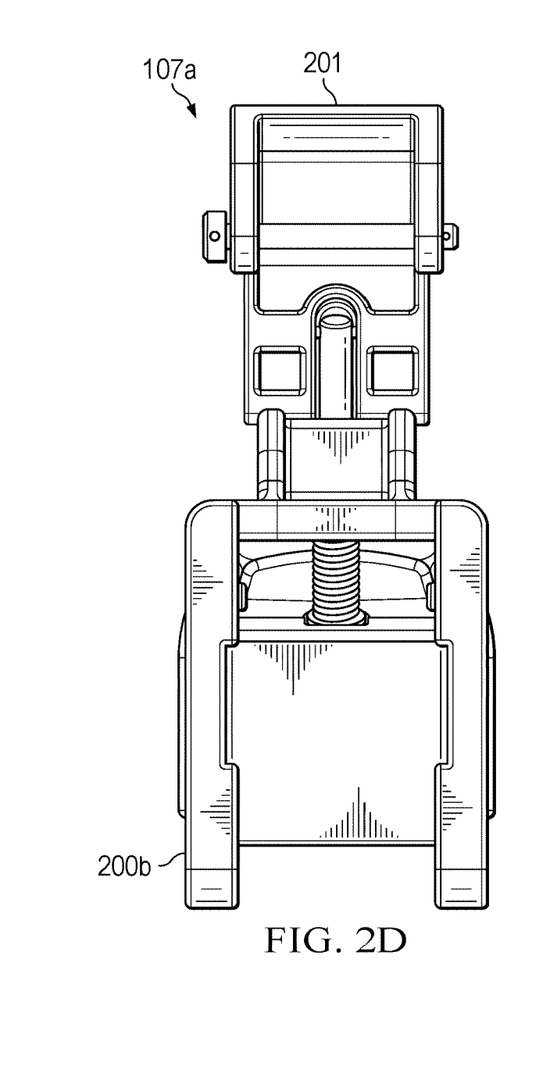
Figure 2E:
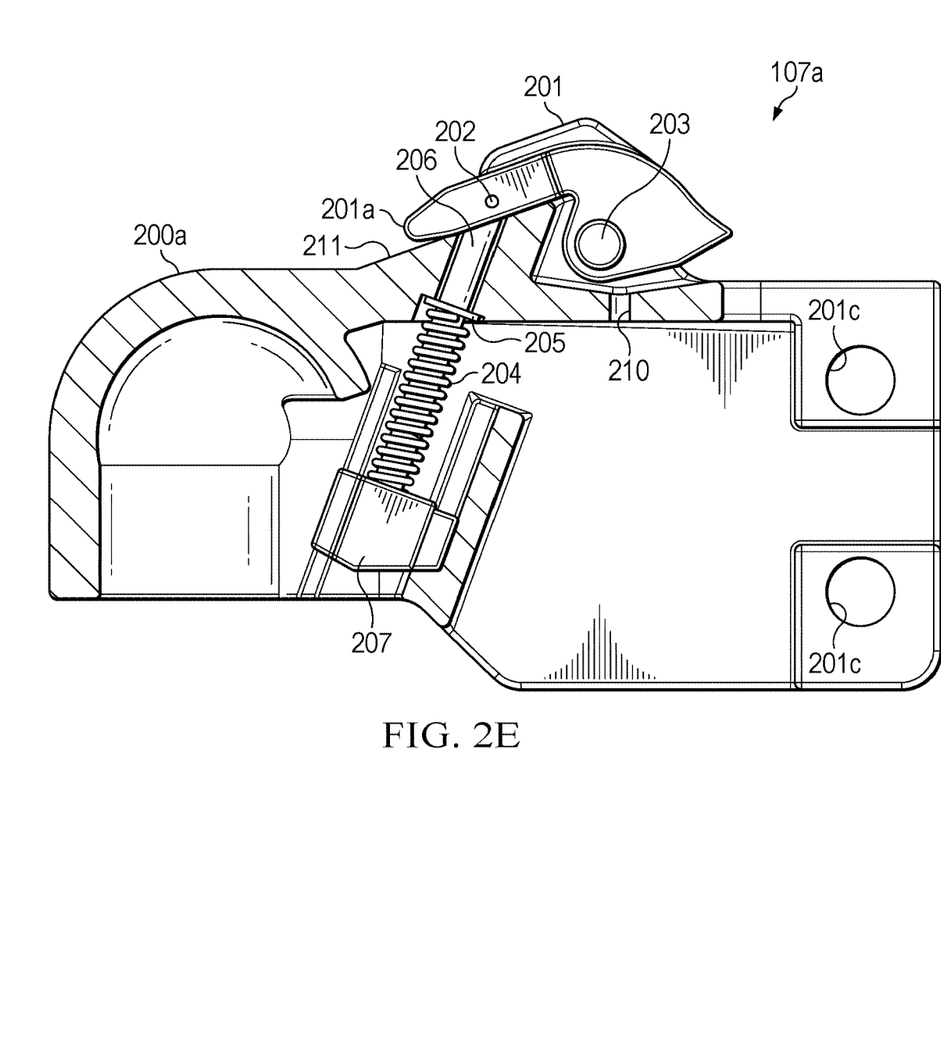
Figure 2F:
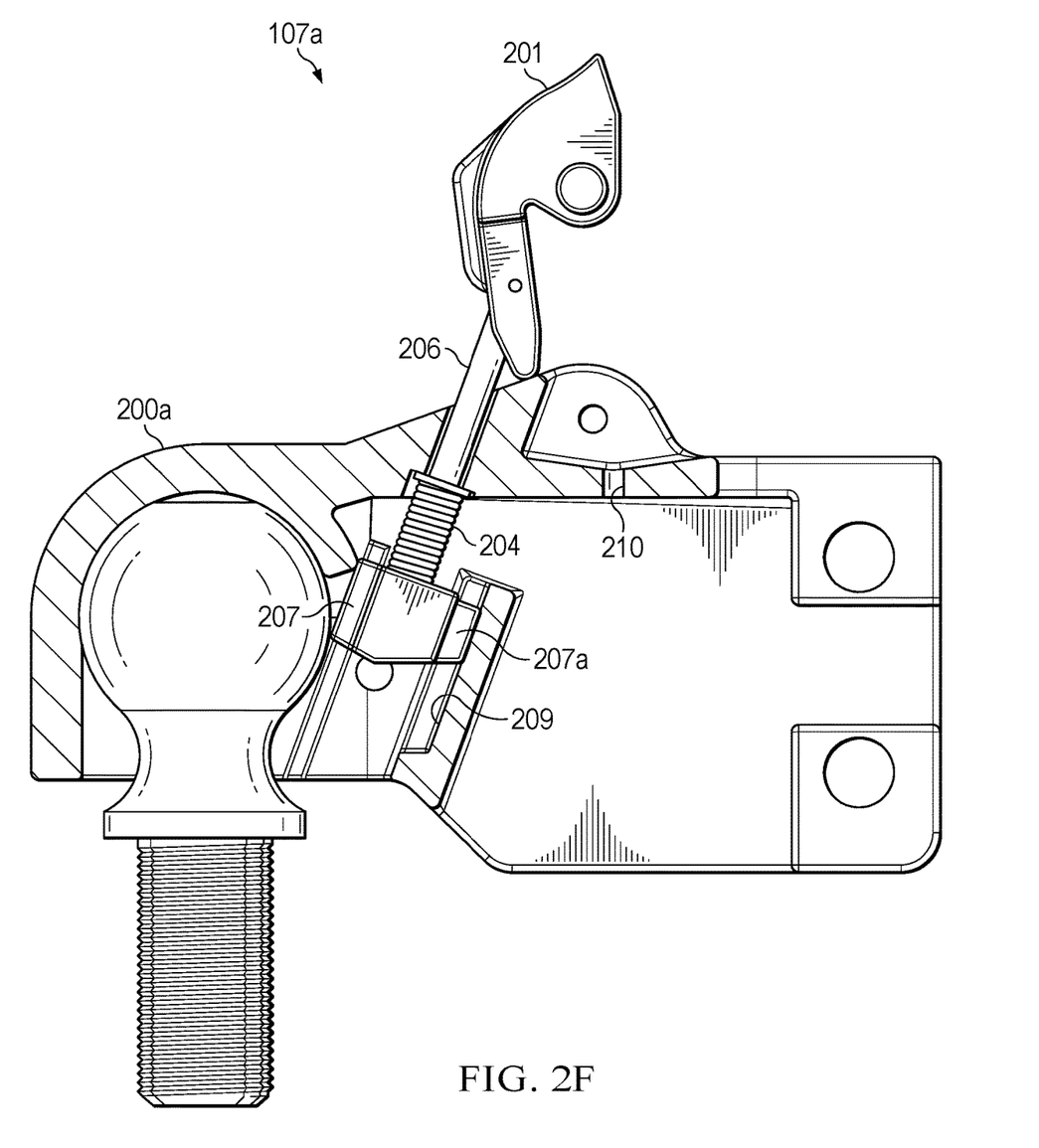
Figure 2G:
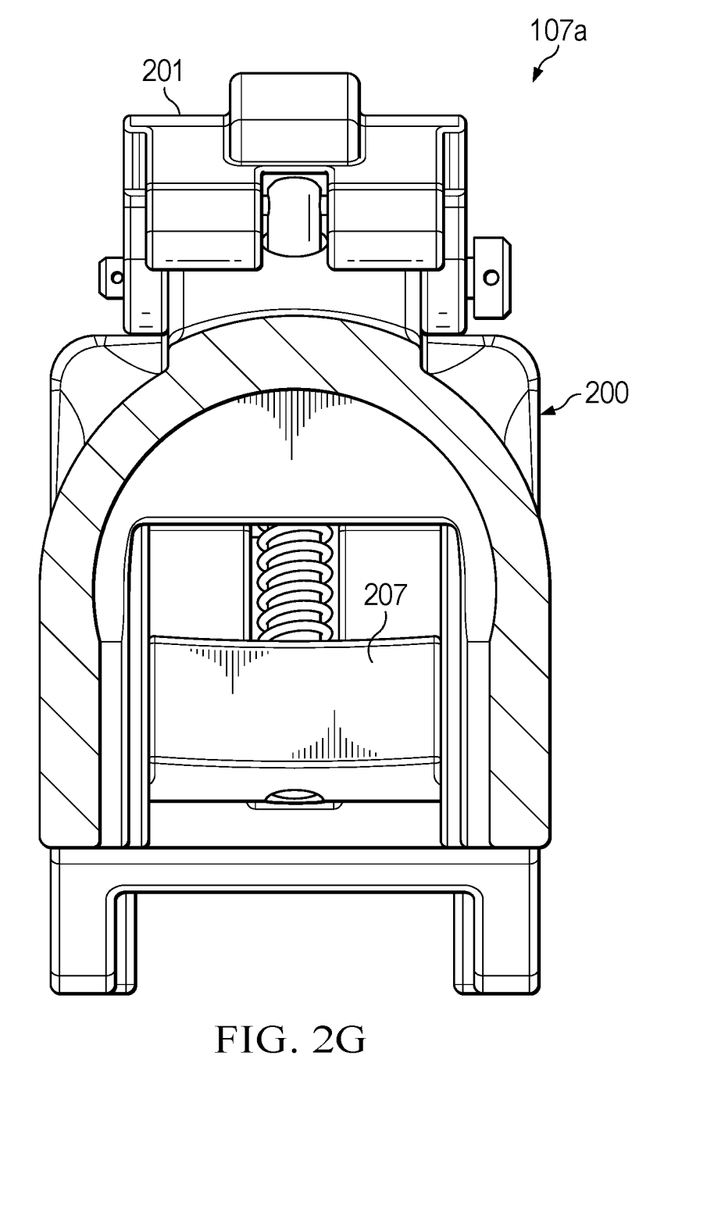
Figure 2H:
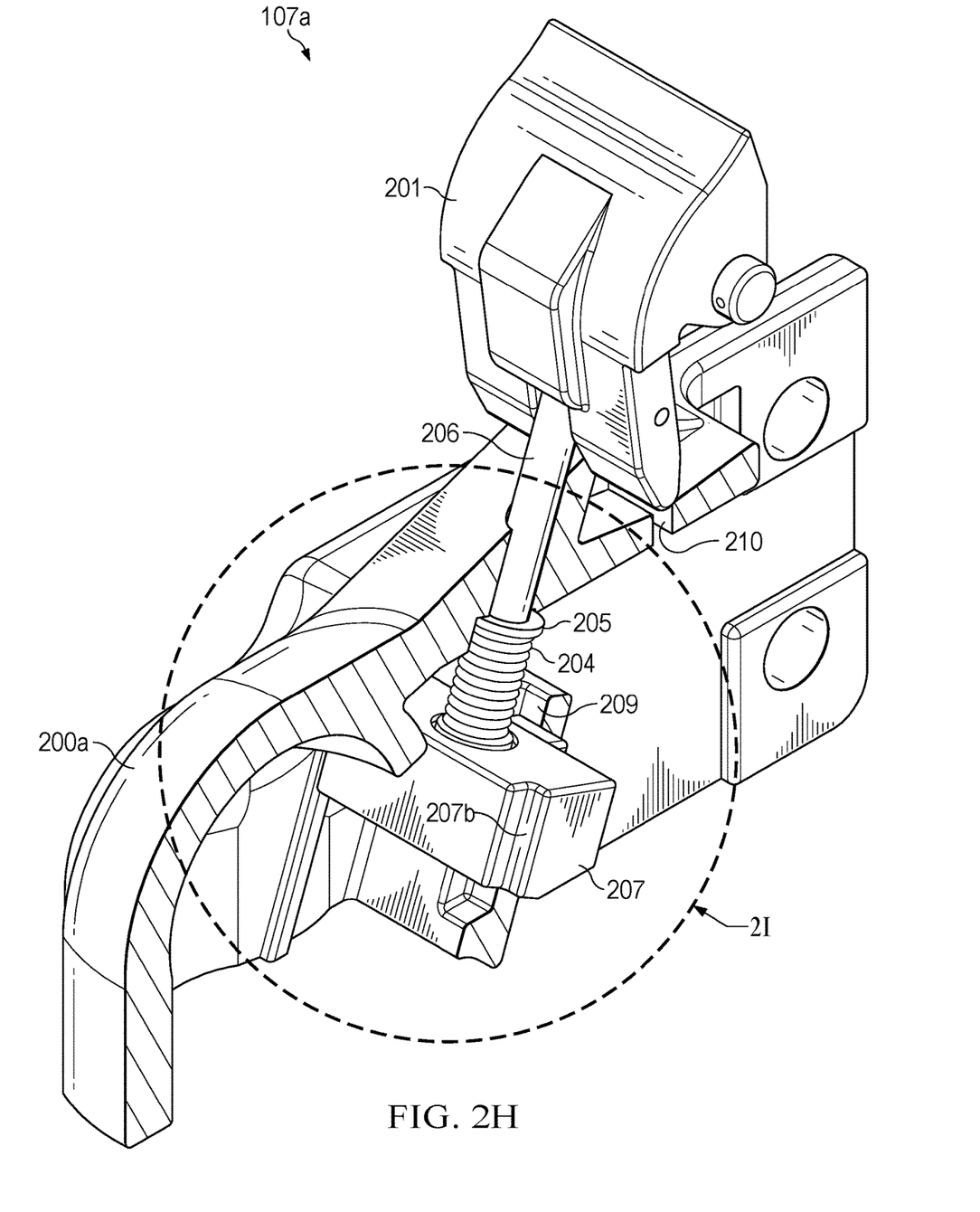
Figure 2I:
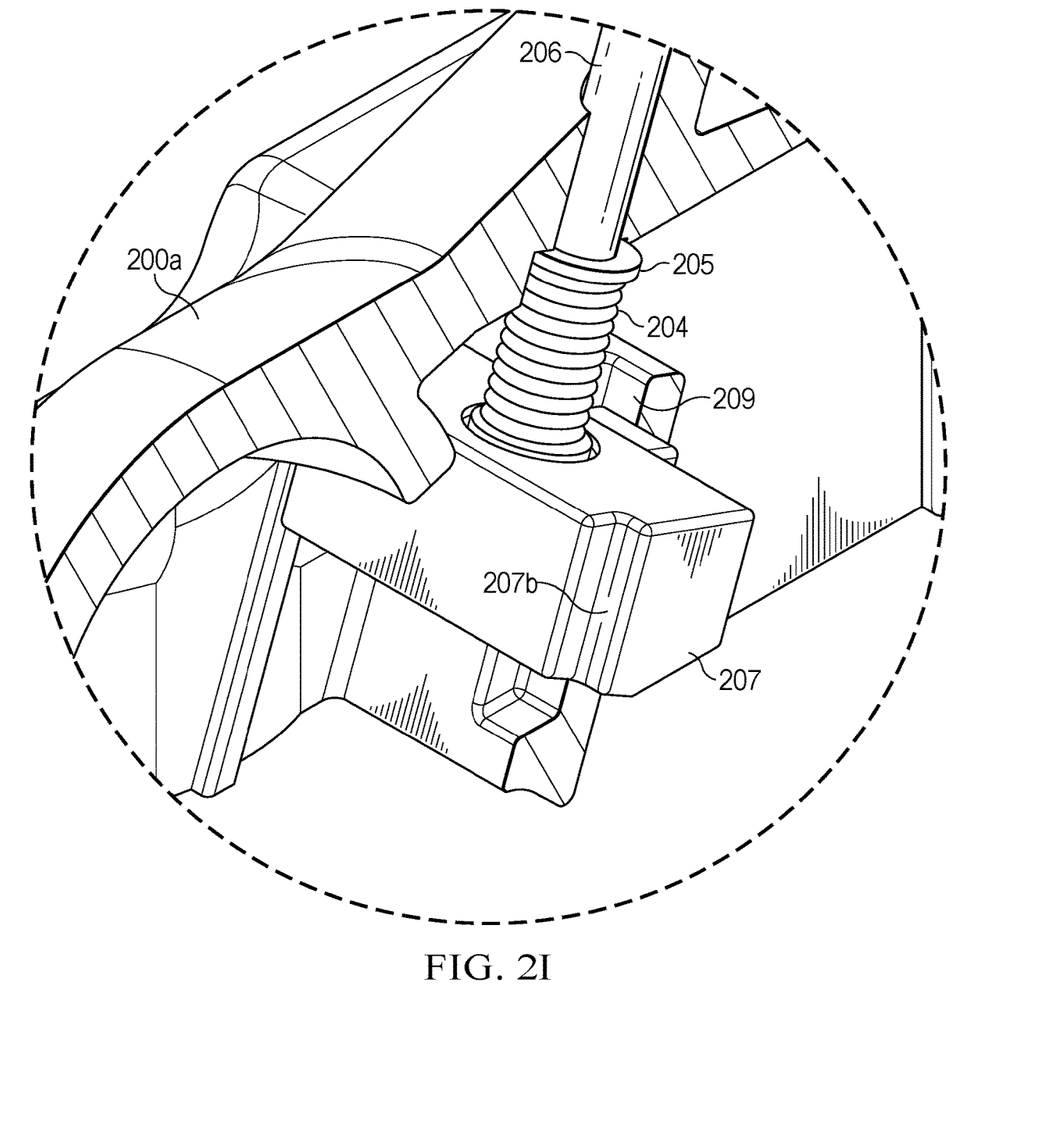

FIG. 2A is an assembled isometric view of the self-actuating ball clamp coupler 107a, and FIG. 2B is an exploded isometric view. FIGS. 2C and 2D are side and rear views, respectively, while FIGS. 2E and 2F are side cutaway views and FIG. 2G is a rear cutaway view. FIG. 2H is a perspective cutaway view, and FIG. 2I is an enlargement of a portion of FIG. 2H.

Self-actuating ball clamp coupler 107a in FIGS. 2A-2I includes a body 200 and a latch release 201. Body 200 has a generally rectangular profile with a nose 200a that is semicylindrical at the bottom and hemispherical at the top. The nose 200a is hollow and open at the bottom, with a U-shaped cross-section (shown, for example, in FIG. 2G) to provide a socket for receiving the ball of a trailer hitch (as shown, for example, in FIG. 2F). The hollow region within the nose is cylindrical with a hemispherical top. The body 200 to the rear of the nose 200a also has a generally U-shaped cross-section in the area of latch release 201 and terminates with two spaced-apart sidewalls 200b. The open space between the sidewalls 200b facilitates manufacture of the self-actuating ball clamp coupler 107a, and reduces the overall weight of the self-actuating ball clamp coupler 107a without materially impacting structural strength. The sidewalls 200b include holes 200c for securing, with bolts (not shown), the body 200 to the tongue of a trailer received in the space between the sidewalls 200b.

Latch release 201 is pivotably secured to body 200 by a pivot pin 202 extending through a spring-biased latch rod 206, and rotates between a closed (latched or secured) position shown in FIGS. 2A, 2C and 2E and an open (released) position shown in FIGS. 2B, 2D and 2F (and in phantom in FIG. 2C). Locking pin 203 is received by holes within latch release 201 and, when latch release 201 is in the closed position, by aligned holes in a latch release mount on the top of the body 200, on the U-shaped portion to the rear of the nose 200a. The latch release mount includes two flanges 200d and a roof 200e extending between portions of the flanges 200d, a structure facilitating manufacture. The aligned holes receiving locking pin 203 extend through the open-top portions of the flanges 200d. The flanges 200d are integrally formed with body 200, simplifying manufacture of the self-actuating ball clamp coupler 107a and improving strength of the locking mechanism. A drain hole 210 extends through the body 200 in the region between flanges 200d, as seen in FIGS. 2E and 2F, and serves as a catch for the tips 201a of the latch release 201, as seen in FIG. 2H.

A hole extends an angle downward from the latch release mount into the opening in the nose 200a. The latch rod 206 extends through that hole, and is surrounded in a lower region below that hole by a spring 204 and a washer 205. A latch ("clamp" or "clamp member") 207 is secured to the latch rod 206, by a threaded screw 211 in the example shown. The spring 204 is in compression and acts on the latch 207 and the washer 205 abutting a surface of the body 200 at one end of the hole through which latch rod 206 extends. The spring 204 urges the latch 207 downward into the body 200, with the result that the latch rod 206 is fully extended into the body 200 and the latch release 201 is moved toward the closed position when the latch 207 is at the lower limit of travel.

The latch release 201 rotates about pivot pin 202, concurrently sliding the tips 201a of the latch release 201 along the roof portion of the latch release mount and retracting latch rod 206 against the biasing force of spring 204. FIG. 2E shows the latch release 201 in the closed or secured position, with the spring 204 expanded as far as permitted by the length of the latch rod 206 and travel of the latch rod 206 and the latch 207 at a lower limit of movement. FIG. 2F shows the latch release 201 in the open position, with spring 204 compressed as much as possible by the travel of latch rod 206 and the latch 207 at an upper limit of movement. As shown in FIG. 2F, when the latch release 201 is in the open position, the latch 207 is adjacent (or above) a largest circumference of the ball hitch. When the latch release 201 is in the closed position, the latch 207 blocks the ball hitch from exiting the opening within the nose 200a of the body 200, securing the ball hitch within the self-actuating ball clamp coupler 107a. As noted above, when the latch release 201 is in the open position of FIG. 2F, the drain hole 210 serves as a catch for the tips 201a of the latch release 201 as seen in FIG. 2H, keeping the latch release 201 in the open position until acted on by a force rotating the latch release 201 back toward the closed position.

The self-actuating ball clamp coupler 107a is self-actuating during connection of the coupler to a ball hitch. Insertion of a ball hitch into the socket of nose 200a results in a surface of the ball hitch contact the latch 207, forcing the latch 207 to move against the biasing force of spring 204. Upward movement of the latch 207 pushes the latch rod 206 upward, and rotates the latch release 201 toward the open position. Once the ball hitch is inserted far enough so that latch 207 reaches a position adjacent the largest circumferential surface of the ball hitch being inserted, the latch 207 is no longer inhibited against downward movement and will be pushed downward by the force of spring 204. The inserted ball hitch is therefore automatically latched or secured within the socket. Release of the ball hitch requires lifting upward on the rear of latch release 201, which can be performed with one hand in the design shown.

One improvement of the design in FIGS. 2A-2I relates to movement of the latch 207. One side of the latch 207 includes indented corners 207b at both ends. The indented corners 207b receive projecting ridges inside the body of the self-actuating ball clamp coupler 107a, guiding movement of the latch 207. The latch 207 also includes a projecting tab 207a received by a slot 209 in a wall of the body 200. The projecting tab 207a guides movement of the latch 207 as the latch release 201 is moved from the closed position to the open position, or vice versa, by sliding within the slot 209. In the example shown, the slot 209 terminates within the body 200 as depicted. However, the terminating end of the slot 209 preferably does not limit downward movement of the latch 207. Instead, the length of the latch rod 206 defines the lower limit of movement for latch 207, when the latch release 201 is fully closed. This configuration avoids the terminating end of the slot 209 from supporting the latch 207 against downward movement, which can potentially result in binding (pinching or crimping) of the latch 207 between the ball hitch and the body 200.

In some embodiments, the slot 209 may be formed without a terminating end. In some embodiments, the slot 209 may lightly contact the terminating end of the slot 209 at the lower limit of travel for the latch 207. In some embodiment, such contact introduces a rotational force on the latch 207, such that further downward movement of the latch 207 against the terminating end of the slot 209 forces the opposing side of the latch 207 into the ball hitch, securing the ball hitch in compression between the latch 207 and the interior wall(s) of the socket of the body 200.

Figure 3A:
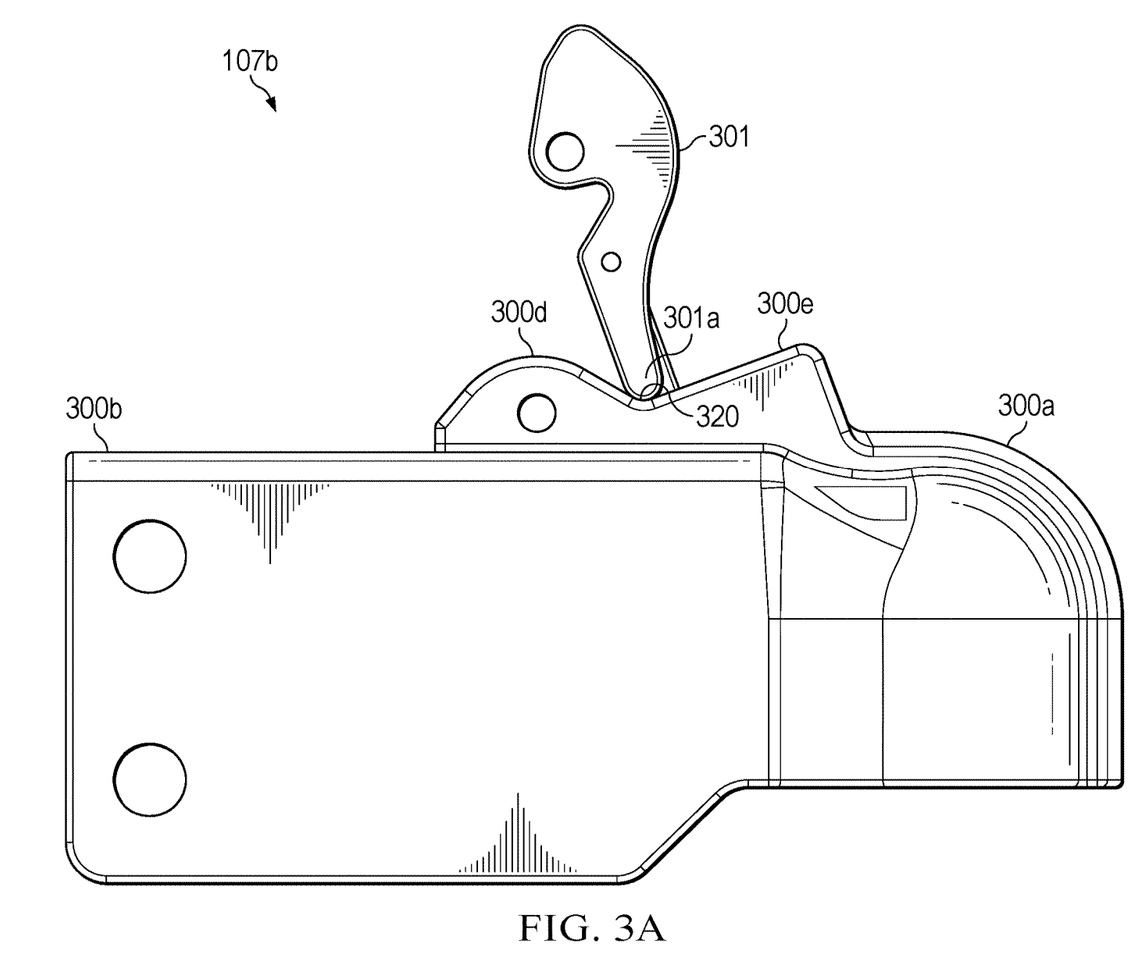
FIGS. 3A through 3C illustrate a self-actuating ball clamp coupler in accordance with another embodiment of the present disclosure.
Figure 3B:
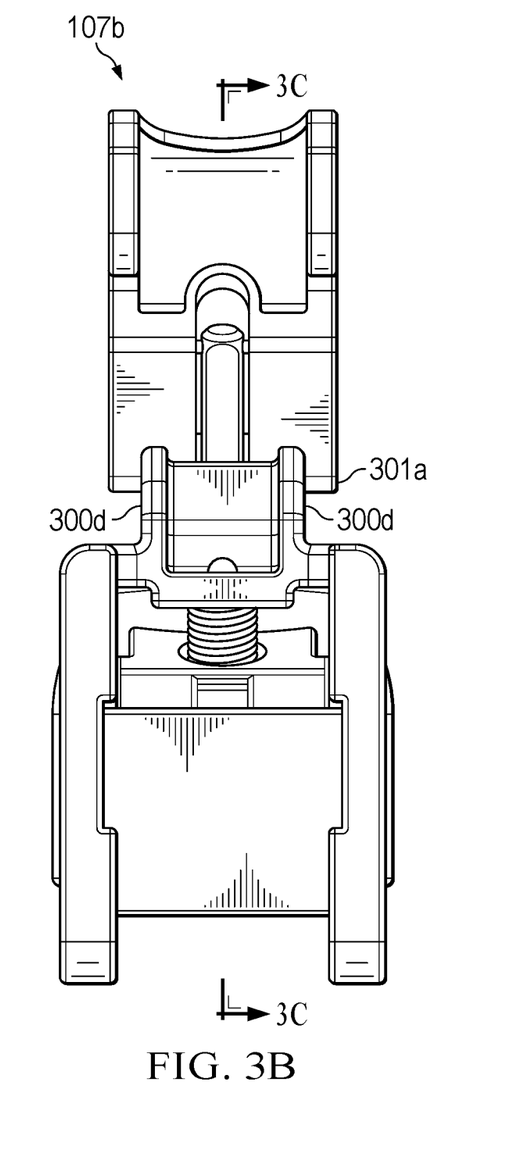
Figure 3C:
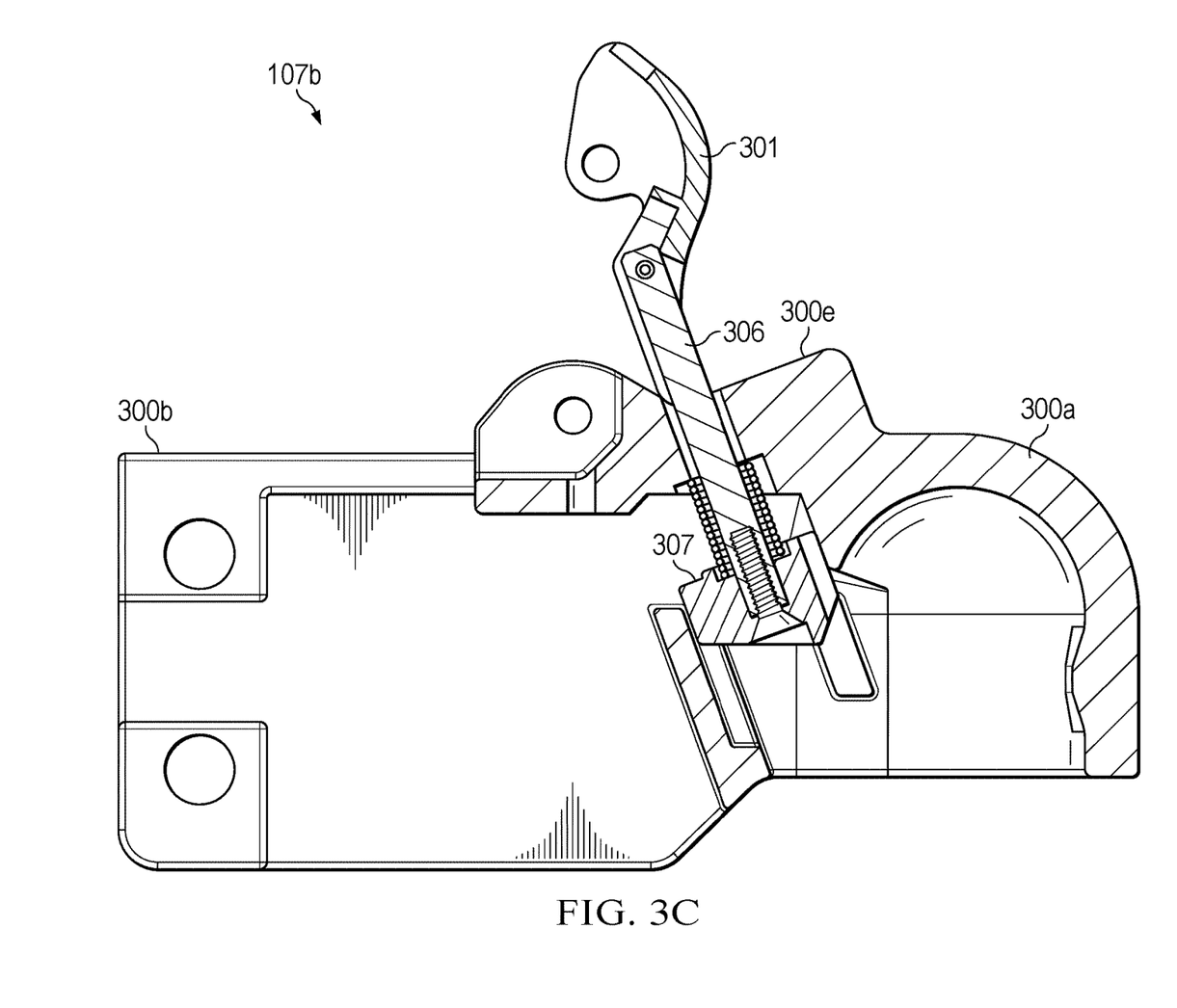

FIGS. 3A through 3C illustrate a self-actuating ball clamp coupler in accordance with another embodiment of the present disclosure. The embodiment of the self-actuating ball clamp coupler 107b depicted in FIGS. 3A-3C is for illustration only. FIGS. 3A-3C do not limit the scope of this disclosure to any particular implementation of a self-actuating ball clamp coupler.

FIGS. 3A and 3B are assembled side and rear views, respectively, similar to FIGS. 2C and 2D. FIG. 3C is a side cutaway view. Self-actuating ball clamp coupler 107b is a similar to self-actuating ball clamp coupler 107a, and includes counterpart features such as body 300 having nose 300a and spaced-apart sidewalls 300b, latch release 301 with tips 301a, and a latch release mount with two flanges 300d and a roof 300e extending between portions of the flanges 300d. However, the shape of the roof 300e differs from the shape of roof 200e. Whereas roof 200e slopes upwardly from nose 200a to flanges 300d, roof 300e has a protrusion that forms a trough 320 between 300a and 300d. The trough 320 is generally aligned with the through-hole for the spring-biased latch rod 306. Trough 320 serves as a catch for tips 301a of the latch release 301 when the latch release 301 is in the open position. In addition, latch rod 306 has a square cross-section, for ease of machining.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A ball hitch coupler, comprising:
   a body having a socket therein, the socket sized for receiving a ball on a ball hitch, wherein the body includes an opening through an upper surface of the body into the socket;
   a latch release pivotably mounted on the upper surface of the body;
   a latch rod extending through the opening through the upper surface of the body and connected at a first end that is external to the body to the latch release; and
   a latch secured to a second end of the latch rod inside the socket, the latch including indented corners at either end of a front surface of the latch and a tab projecting from adjacent portions of a rear surface of the latch, a longest dimension of the tab oriented parallel to the latch rod, the tab received by a slot recessed within a wall for a space in the body within which the latch travels, wherein the indented corners and the tab guide movement of the latch.

2. The ball hitch coupler according to claim 1, wherein rotation of the latch release from a closed position toward an open position retracts a portion of the latch rod through the opening through the body and moves the latch upward within the socket while the tab slides within the slot, and
   wherein rotation of the latch release from the open position toward the closed position extends the portion of the latch rod through the opening through the body and moves the latch downward within the socket while the tab slides within the slot.

3. The ball hitch coupler according to claim 2, further comprising:
   a spring positioned relative to the latch rod and the body to urge the latch toward downward movement into the socket.

4. The ball hitch coupler according to claim 3, wherein insertion of the ball into the socket pushes the latch upward against the spring until the latch is adjacent to a largest circumferential surface of the ball, and
   wherein, once the latch is adjacent to the largest circumferential surface of the ball, the spring automatically moves the latch downward into a position at which the latch blocks withdrawal of the ball from the socket.

5. The ball hitch coupler according to claim 4, wherein, while the ball is inserted in the socket, rotation of the latch release from the closed position to the open position moves the latch to or above the position adjacent to the largest circumferential surface of the ball, allowing the ball to be withdrawn from the socket.

6. The ball hitch coupler according to claim 1, wherein the body includes a nose including the socket at a first end and spaced apart sidewalls at a second end, the spaced apart sidewalls including holes for securing the body to a tongue of a trailer to be towed.

7. The ball hitch coupler according to claim 1, wherein the body includes a latch mount integrally formed with the body, the latch mount having flanges with holes therethrough, wherein one or more holes in the latch release align with the holes through the flanges when the latch release is in a closed position, and wherein a locking pin is received by the one or more holes in the latch release and the holes through the flanges.

8. The ball hitch coupler according to claim 7, wherein the latch mount includes upper surfaces forming a trough.

9. A ball hitch coupler, comprising:
a body having a socket therein, the socket sized for receiving a ball on a ball hitch, wherein the body includes an opening through an upper surface of the body into the socket;
a latch release pivotably mounted on a latch mount integrally formed on the upper surface of the body, the latch release having tips sliding along the upper surface of the body during movement of the latch release from a closed position to an open position, the latch mount having a drain hole forming a catch for the tips of the latch release when the latch release is in the open position;
a latch rod extending through the opening through the latch mount and connected at a first end that is external to the body to the latch release; and
a latch secured to a second end of the latch rod inside the socket, the latch including a tab projecting from a rear surface of the latch and received by a slot within the body to guide movement of the latch.

10. The ball hitch coupler according to claim 9, wherein rotation of the latch release from the closed position toward the open position retracts a portion of the latch rod through the opening through the latch mount and moves the latch upward within the socket while the tab slides within the slot, and
wherein rotation of the latch release from the open position toward the closed position extends the portion of the latch rod through the opening through the latch mount and moves the latch downward within the socket while the tab slides within the slot.

11. The ball hitch coupler according to claim 10, further comprising:
a spring positioned relative to the latch rod and the body to urge the latch toward downward movement into the socket.

12. The ball hitch coupler according to claim 11, wherein insertion of the ball into the socket pushes the latch upward against the spring until the latch is adjacent to a largest circumferential surface of the ball, and
wherein, once the latch is adjacent to the largest circumferential surface of the ball, the spring automatically moves the latch downward into a position at which the latch blocks withdrawal of the ball from the socket.

13. The ball hitch coupler according to claim 12, wherein, while the ball is inserted in the socket, rotation of the latch release from the closed position to the open position moves the latch to or above the position adjacent to the largest circumferential surface of the ball, allowing the ball to be withdrawn from the socket.

* * * * *

UNITED STATES PATENT AND TRADEMARK OFFICE
CERTIFICATE OF CORRECTION

| | |
|---|---|
| PATENT NO. | : 11,623,485 B1 |
| APPLICATION NO. | : 17/709121 |
| DATED | : April 11, 2023 |
| INVENTOR(S) | : Abram Loewen Harms et al. |

It is certified that error appears in the above-identified patent and that said Letters Patent is hereby corrected as shown below:

On the Title Page

Item (72), Line 1, delete "Abraham Loewen Harms" and insert --Abram Loewen Harms--.

Signed and Sealed this
Twenty-third Day of May, 2023

Katherine Kelly Vidal

Katherine Kelly Vidal
*Director of the United States Patent and Trademark Office*